United States Patent Office
3,551,228
Patented Dec. 29, 1970

3,551,228
GLASS ETCHING COMPOSITION AND METHOD OF PREPARING NONREFLECTIVE GLASS
Max Meth, Miami Beach, Fla., assignor, by mesne assignments, to Rose Meth, executrix of the estate of said Max Meth, deceased, Miami Beach, Fla.
No Drawing. Continuation-in-part of application Ser. No. 761,832, Sept. 23, 1968, which is a continuation-in-part of application Ser. No. 541,946, Apr. 12, 1966. This application Oct. 6, 1969, Ser. No. 864,209
Int. Cl. C03c 15/00; C09k 3/00
U.S. Cl. 156—24
18 Claims

ABSTRACT OF THE DISCLOSURE

A method is disclosed for preparing high quality, non-reflective glass by a single, short dip of glass articles in an etching solution, followed by rinsing. The preferred glass etching compositions of the invention consist essentially of from about 0.6 to 0.9 part by weight of hydrofluoric acid, calculated as anhydrous HF; from about 0.85 to 1.3 parts by weight of sulfuric acid, calculated as anhydrous $H_2SO_4$; from about 0.23 to 0.9 part by weight of glycerine; from about 0.25 to 0.4 part by weight of a compound selected from the group consisting of ammonium bifluoride, ammonium fluoride, ammonium hydroxide, ammonium sulfate, and ammonium carbonate, and about 1 part by weight of water. Typically, glass articles, for example panes of glass for picture frames or television picture tubes, are dipped in the etching composition for a period of about 5 to 60 seconds, preferably 10 to 30 seconds, the etching composition being at ambient temperature, preferably a temperature of about 60° to 85° F.

CROSS REFERENCE TO RELATED APPLICATIONS

This application is a continuation-in-part of my application Ser. No. 761,832, filed Sept. 23, 1968, now abandoned, as a continuation-in-part of my application Ser. No. 541,946, filed Apr. 12, 1966, now abandoned.

BACKGROUND OF THE INVENTION

Nonreflective glass which is used, for example, in picture frames and television picture tubes, is a commercially available item having a uniformly roughened matte or diffusing surface to reduce its reflectivity, so that an observer standing between a light source and the glass sees little or no reflection. The roughness of the glass surface is of microscopic magnitude so that the otherwise normal transparency of the glass is substantially maintained.

It is known that a mixture of hydrofluoric acid and sulfuric acid in conjunction with certain ammonium salts will etch glass to form a roughened surface. However, difficulties have been encountered in finding a process for etching glass with this mixture which provides a roughened surface of such fineness as to essentially retain transparency and of such uniformity across the entire surface of the glass as to be commercially acceptable as a non-reflective glass for picture frames, for example. While some prior art etching solutions have been too weak to etch a uniformly fine roughened surface, other etching solutions have been too strong and rapidly etch a coarse, roughened surface into the glass so that the glass has a non-uniform, "frosted" appearance upon drying which seriously impairs its transparency.

Attempts to solve the problem have been made by treating the glass in a series of slow-acting etching baths for greater control in the preparation of the fine, uniformly etched surface which is required for high quality nonreflective glass. An example of such a process is that described in the Gilstrap et al. Pat. No. 2,622,016.

SUMMARY OF THE INVENTION

This application relates to a novel etching bath and to a process for etching a uniformly fine roughened surface into glass articles to cause the surface to be generally nonreflective but essentially transparent. This is accomplished in accordance with the invention by the use of a single etching bath in which the glass articles to be etched are subjected to a single immersion for a brief period of time.

In the process of this invention, the reflectivity of a transparent glass article is reduced by immersing the article in an aqueous solution of a mixture of hydrofluoric acid, sulfuric acid, an ammonium compound selected from any of ammonium bifluoride, ammonium fluoride, ammonium hydroxide, ammonium sulfate, or ammonium carbonate, and glycerine to provide a generally uniform finely etched surface to glass which is brought into contact with the etching composition. After a generally uniform finely roughened surface has formed on the glass article and the same is still transparent, but before the roughened surface has had time to become so coarse as to be nonuniform and hazy when dry, the glass articles are removed from the etching composition and rinsed.

The above composition but without glycerine therein can provide an etch on glass; however, the etched surface is rough, uneven and pitted and the glass is not suitable for use in accordance with the invention. By the addition of the glycerine to this otherwise unsuitable etching bath, in amount of at least about 6 weight percent, an etching bath is provided which etches on glass a generally smooth, uniform light diffusing surface.

Best etching results are achieved when the etching bath of the invention consists essentially of (a) from about 0.6 to 0.9 part by weight of hydrofluoric acid, calculated as anhydrous HF; (b) from about 0.85 to 1.3 parts by weight of sulfuric acid, calculated as anhydrous $H_2SO_4$; (c) from about 0.23 to 0.9 part by weight of glycerine; (d) from about 0.25 to 0.4 part by weight of ammonium bifluoride, ammonium fluoride, ammonium hydroxide, ammonium sulfate, or ammonium carbonate; and about 1 part by weight of water.

The time of immersion of the glass article in the etching composition of the invention, for optimum results, varies, in the main, in accordance with the specific formulation of the etching composition used, the nature of the glass, and the temperature of the etching composition. Generally, good results are obtained when the time of immersion is between 5 seconds and one minute, and the etching bath is at ambient temperature. Best results are usually obtained when the time of immersion is between 10 and 30 seconds, and the temperature of the etching baths is in the range of 60° to 85° F.

In general, the optimum time of immersion shortens as the temperature of the etching composition rises. For example, if for a specific etching composition the optimum time of immersion is about 30 seconds when the composition has a temperature of 60° F., the optimum etching time is about 15 seconds when the etching composition has a temperature of 80° F.

While the ingredients of, and the proportions thereof in, the etching composition of this invention are as stated above, the following should be noted. The preferred about 0.6 to 0.9 part by weight of hydrofluoric acid [ingredient (a)] is generally added as a water solution, e.g., as the commercially available 70% grade of hydrofluoric acid. Nevertheless, the weight of the hydrofluoric acid present as ingredient (a) is calculated on an anhydrous basis. The water present in the hydrofluoric acid solution is considered to be part of ingredient (e), described above. Likewise, the preferred about 0.85 to 1.3 parts by weight of sulfuric acid [ingredient (b)] is generally added in water solution, e.g., the 66° Baumé (96%) commercial grade of sulfuric acid, but the weight of the acid is calculated as ingredient (b) on an anhydrous basis, while the water of the acid solution is considered to be part of ingredient (e).

As for the glycerine, it is preferred that it be present in the etching composition of this invention in an amount of about 30 to 60 weight percent, based on the weight of the hydrofluoric acid present [ingredient (a)].

The preferred ingredient (d) of the etching composition of this invention is ammonium bifluoride, suitably in the form which is commercially available, or that made by partially neutralizing hydrofluoric acid with ammonia in accordance with known practice.

Mixture of ammonium bifluoride and other materials such as ammonium sulfate or ammonium carbonate can also be used, as can also ammonium fluoride, per se. The latter is generally used in smaller quantities than ammonium bifluoride because of its higher ammonium content. Ammonium hydroxide can be added to the etching composition to prepare in situ a mixture of ammonium bifluoride and ammonium sulfate by reaction with portions of the hydrofluoric acid and sulfuric acid ingredients.

Generally, from about 30 to 50 weight percent of ingredient (d) should be present in the etching composition of this invention, based on the weight of the hydrofluoric acid present [ingredient (a)] in order to minimize loss of transparency in the glass while obtaining a commercially satisfactory reduction of reflectivity in the glass.

It is important that the glass article to be made nonreflective be removed from the etching bath in the approximate time indicated to avoid coarseness and nonuniformity in the etch. For this reason, too, when the glass article is removed from the etching bath, it is promptly rinsed to halt the etching reaction before nonuniformity sets in. If desired, a second rinse can be performed on each glass article. After the rinsing, the glass articles are dried in any desired manner, as by warm air drying, for example. If desired, the rinse bath may consist of hot water, about 130°–150° F., to accelerate the drying of the glass articles removed from the bath.

If maintained at room temperature, the etching bath of this invention is quite stable for periods of time in the order of about three months or more. Before use of the etching composition of this invention, it is desirable to agitate it to insure thorough mixture of the ingredients, since the best results are obtained when the mixture is homogeneous.

The desirable results of this invention require the presence of glycerine in the etching composition disclosed herein. The reason therefor is not understood, although it has been noted that the glycerine increases the viscosity of the etching composition and assist in keeping the same homogeneous during use. Other polyhydric alcohols, including ethylene glycol, diethylene glycol, trimethylolpropane and pentaerythritol do not provide the etching results obtainable with glycerine.

DESCRIPTION OF SPECIFIC EMBODIMENTS

The following examples illustrate the invention:

EXAMPLE 1

An etching bath is prepared from 3 gallons of 70% commercial grade hydrofluoric acid, 2 gallons of 66° Baumé (96%) commercial grade sulfuric acid, 12 pounds of ammonium sulfate, 3 gallons of glycerine, and 2 gallons of water.

Thus the etching bath contains about 0.78 part by weight of anhydrous HF, 1.10 part by weight of anhydrous $H_2SO_4$, 0.42 part by weight of ammonium sulfate, 1.17 part by weight of glycerine, and 1 part by weight of water.

The temperature of the bath rises during mixing of the ingredients, so the bath is generally allowed to cool before use.

Cleaned glass panes are immersed in the etching bath after the bath has cooled to a temperature of about 65° F. for a period of about 30 seconds. The panes of glass are then removed, rinsed, and dried. The etched surfaces of the dried panes are nonreflective, but still retain transparency.

EXAMPLE 2

Results similar to those of Example 1 are obtained when the ammonium sulfate ingredient is replaced with ammonium bifluoride in equal weight.

The following example illustrates the beneficial effect of glycerine in glass etching compositions which contain ammonium salts.

EXAMPLE 3

(a) A glass etching formulation was prepared from 3 gallons of 70% commercial grade hydrofluoric acid, 3 gallons of 66° Baumé (96%) commercial grade sulfuric acid, 9 pounds of ammonium bifluoride, and 3 gallons of water. No glycerine was added.

The formulation was allowed to cool to about 70°–75° F. after mixing. After the mixture had cooled, a pane of glass was immersed in the etching bath for a period of about 15 seconds. The etched pane of glass was then removed from the bath, rinsed, and dried.

The dried glass pane had an etched, rough surface which was highly nonuniform in appearance, containing many large pits.

(b) Five pints of glycerine were then added to the etching bath (a), the bath being stirred to thoroughly mix the ingredients.

The newly formed bath thus contained about 0.58 part by weight of anhydrous HF, 1.24 parts by weight of anhydrous $H_2SO_4$, 0.19 part by weight of glycerine, 0.26 part by weight of ammonium bifluoride, and 1 part by weight of water.

A pane of glass was immersed in the etching bath for a period of about 15 seconds, and was then removed, rinsed, and dried.

The dried pane of glass had an etched, nonreflective surface of greatly improved uniformity, compared with the previously etched pane of glass, with fewer large pits.

EXAMPLE 4

A mixture is prepared of 3 gallons of 70% hydrofluoric acid, 3 gallons of 66° Baumé (96%) sulfuric acid, 7 pints of glycerine, 9 pounds of ammonium bifluoride, and 3 gallons of water. This corresponds to about 0.58 part of anhydrous HF, 1.24 parts by weight of anhydrous $H_2SO_4$, 0.26 part by weight of glycerine, 0.26 part by weight of ammonium bifluoride, and 1 part by weight of water.

After the above formulation is allowed to cool to about 75°–80° F., a pane of glass is dipped in the etching bath for a period of about 15 seconds. The now etched panes of glass are then removed from the bath, rinsed with water, and dried in the air.

The dried glass panes have a generally uniform, nonreflective, etched surface which still retains transparency.

EXAMPLE 5

An etching bath is prepared from 3 gallons of 70% hydrofluoric acid, 3½ gallons of 66° Baumé (96%) sulfuric acid, 9 pints of glycerine, 10 pounds of ammonium bifluoride, and 3 gallons of water.

The formulation contains about 0.58 part by weight of anhydrous HF, 1.44 parts by weight of anhydrous $H_2SO_4$, 0.31 part by weight of glycerine, 0.28 part by weight of ammonium bifluoride, and 1 part by weight of water.

The etching bath is cooled to about 70°–75° F., and glass panes are dipped in the bath for about 15 seconds. They are then removed, rinsed, and dried. The dried glass panes exhibit an etched, generally uniform, nonreflective surface which retains much of its transparency.

EXAMPLE 6

A glass etching composition is prepared containing 3½ gallons of 70% commercial grade hydrofluoric acid, 3 gallons of 66° Baumé (96%) commercial grade sulfuric acid, 1 gallon of glycerine, 10 pounds of technical grade ammonium bifluoride, and 3 gallons of water.

Thus the formulation contains, in parts by weight, about 0.66 part of anhydrous HF, 1.18 parts of anhydrous sulfuric acid, 0.28 part of glycerine, 0.27 part of ammonium bifluoride, and 1 part of water.

When the mixture was cooled to about 70° to 75° F., panes of glass which have been cleaned to remove all grease and other foreign material, are immersed in the etching bath for a period of about 15 seconds. The now etched panes of glass are removed from the bath, rinsed, and dried.

The etched, dried glass sheets are uniformly nonreflective, but retain most of their transparency.

EXAMPLE 7

A glass etching composition is prepared containing 4½ gallons of 70% commercial grade hydrofluoric acid, 3 gallons of 66° Baumé (96%) commercial grade sulfuric acid, 4½ quarts of glycerine, 14 pounds of technical grade ammonium bifluoride, and 3 gallons of water. Thus the formulation contains in parts by weight, about 0.79 part of anhydrous HF, 1.1 part of anhydrous sulfuric acid, 0.30 part of glycerine, 0.35 part of ammonium bifluoride, and 1 part of water.

When the temperature of the mixed ingredients of the etching bath cools to about 75° F., panes of glass intended for use in picture frames which have been carefully cleaned to remove all grease and other foreign material, are immersed in the etching bath for a period of about 20 seconds. The now etched panes of glass are removed from the bath and promptly immersed in a cold water bath (tap water) to rinse the etching components from the glass and thus halt the etching process.

Following this, the panes of glass are dipped in a hot water bath having a temperature of about 130° F. and allowed to remain there until warm. Then they are removed from the hot water bath and air dried. The dried glass sheets are nonreflective, and have a surface of highly uniform appearance, yet are sufficiently transparent so that they function in a highly satisfactory manner as glass panes in picture frames.

EXAMPLE 8

An etching bath is prepared from 4 gallons of 70% hydrofluoric acid, 3½ gallons of 66° Baumé (96%) sulfuric acid, 10 pints of glycerine, 9 pounds of ammonium bifluoride, and 3 gallons of water. Thus the formulation contains about 0.72 part by weight of anhydrous HF, 1.32 parts by weight of anhydrous $H_2SO_4$, 0.34 part by weight of glycerine, 0.23 part by weight of ammonium bifluoride, and 1 part by weight of water.

The etching bath is cooled to about 70 to 75° F. and glass panes are dipped in the bath for about 15 seconds. They are then removed, rinsed, and dried. The dried glass panes exhibit a generally uniform, etched, nonreflective surface which retains transparency.

EXAMPLE 9

A glass etching composition is prepared containing 4 gallons of 70% commercial grade hydrofluoric acid, 3½ gallons of 66° Baumé (96%) commercial grade sulfuric acid, 12 pints of glycerine, 12 pounds of ammonium bifluoride, and 3 gallons of water. Thus the formulation contains, in parts by weight, about 0.72 part of anhydrous HF, 1.32 parts by weight of anhydrous $H_2SO_4$, 0.37 part by weight of glycerine, 0.29 part by weight of ammonium bifluoride, and 1 part of water.

Panes of glass were dipped in the etching bath, and maintained at a temperature of about 70° F. for a period of about 15 seconds. The panes of glass were then removed, rinsed and dried.

The dried pane of glass had a highly uniform, etched, nonreflective surface which still retains transparency.

What is claimed is:

1. A glass etching composition for reducing the reflectivity of glass, consisting essentially of an aqueous solution of a mixture of hydrofluoric acid, sulfuric acid, an ammonium compound selected from the group consisting of ammonium bifluoride, ammonium fluoride, ammonium hydroxide, ammonium sulfate, and ammonium carbonate, and glycerine, said hydrofluoric acid (calculated as anhydrous HF) being present in an amount from about 0.6 to 0.9 part by weight per 1 part by weight of water.

2. The composition of claim 1 in which said ammonium compound is ammonium bifluoride in an amount from about 0.25 to 0.4 part by weight per 1 part by weight of water.

3. A glass etching composition consisting essentially of:
   (a) from about 0.6 to 0.9 part by weight of hydrofluoric acid, calculated as anhydrous HF;
   (b) from about 0.85 to 1.3 parts by weight of sulfuric acid, calculated as anhydrous $H_2SO_4$;
   (c) from about 0.23 to 0.4 part by weight of glycerine;
   (d) from about 0.25 to 0.4 part by weight of a compound selected from the group consisting of ammonium bifluoride, ammonium fluoride, ammonium hydroxide, ammonium sulfate, and ammonium carbonate; and
   (e) about 1 part by weight of water.

4. The composition of claim 3 which contains from 30 to 60 weight percent of glycerine, based on the weight of ingredient (a) present.

5. The composition of claim 3 which contains from 30 to 50 weight percent of ingredient (d), based on the weight of ingredient (a) present.

6. The composition of claim 1 consisting essentially of:
   (a) about 0.78 part by weight of hydrofluoric acid, calculated as anhydrous HF;
   (b) about 1.10 parts by weight of sulfuric acid, calculated as anhydrous $H_2SO_4$;
   (c) about 1.17 parts by weight of glycerine;
   (d) about 0.42 part by weight of ammonium bifluoride; and
   (e) about 1 part by weight of water.

7. The composition of claim 3 consisting essentially of:
   (a) about 0.66 part by weight of hydrofluoric acid, calculated as anhydrous HF;
   (b) about 1.18 parts by weight of sulfuric acid, calculated as anhydrous $H_2SO_4$;
   (c) about 0.28 part by weight of glycerine;
   (d) about 0.27 part by weight of ammonium bifluoride; and
   (e) about 1 part by weight of water.

8. The composition of claim 3 consisting essentially of:
   (a) about 0.72 part by weight of hydrofluoric acid, calculated as anhydrous HF;
   (b) about 1.32 parts by weight of sulfuric acid, calculated as anhydrous $H_2SO_4$;
   (c) about 0.37 part by weight of glycerine;
   (d) about 0.29 part by weight of ammonium bifluoride; and
   (e) about 1 part by weight of water.

9. The composition of claim 3 consisting essentially of:
   (a) about 0.79 part by weight of hydrofluoric acid, calculated as anhydrous HF;
   (b) about 1.1 parts by weight of sulfuric acid, calculated as anhydrous $H_2SO_4$;
   (c) about 0.30 part by weight of glycerine;

(d) about 0.35 part by weight of ammonium bifluoride; and (e) about 1 part by weight of water.

10. The process of reducing the reflectivity of a transparent, smooth glass article which comprises immersing the glass article in an etching composition consisting essentially of an aqueous solution of a mixture of hydrofluoric acid, sulfuric acid, an ammonium compound selected from the group consisting of ammonium bifluoride, ammonium hydroxide, ammonium sulfate, and ammonium carbonate, and glycerine for a time to provide a generally uniformly roughened surface on the glass article without elimination of the essential transparency thereof, removing said glass article from said etching composition, and rinsing the same before said roughened surface becomes so coarse as to be hazy when dry, said hydrofluoric acid being present in said aqueous solution in an amount from about 0.6 to about 0.9 part by weight (calculated as anhydrous HF) per 1 part by weight of water.

11. The process of reducing the reflectivity of a transparent, smooth glass article which comprises immersing the glass article in an etching composition consisting essentially of:

(a) from about 0.6 to 0.9 part by weight of hydrofluoric acid, calculated as anhydrous HF;

(b) from about 0.85 to 1.3 parts by weight of sulfuric acid, calculated as anhydrous $H_2SO_4$;

(c) from about 0.23 to 0.9 part by weight of glycerine;

(d) from about 0.25 to 0.4 part by weight of a compound selected from the group consisting of ammonium bifluoride, ammonium fluoride, ammonium hydroxide, ammonium sulfate, and ammonium carbonate; and (e) about 1 part by weight of water; for a time until a generally uniformly roughened surface has formed on the glass article without elimination of the essential transparency thereof, and removing said glass article from said etching composition and rinsing the same before said roughened surface becomes so coarse as to be hazy when dry.

12. The process of claim 11 in which the etching composition during immersion of the glass article is at an ambient temperature, and the time of immersion is from about 5 to 60 seconds.

13. The process of claim 11 in which the temperature of the etching composition is from about 60°–85° F., and the immersion time is from about 10 to 30 seconds.

14. The process of claim 11 in which ingredient (d) is ammonium bifluoride.

15. The process of claim 11 in which said etching composition contains from 30 to 60 weight percent of glycerine, based on the weight of ingredient (a) present.

16. The process of claim 11 in which said etching composition contains from 32 to 50 weight percent of ingredient (d), based on the weight of ingredient (a) present.

17. The process of claim 11 in which said glass article is in sheet form.

18. The process of claim 11 in which, after said rinsing, the glass article is rinsed a second time in hot water and allowed to dry in the air.

References Cited

UNITED STATES PATENTS

| | | | |
|---|---|---|---|
| 2,622,016 | 12/1952 | Gilstrap et al. | 156—24UX |
| 2,999,013 | 9/1961 | Meth | 156—24X |
| 3,374,130 | 3/1968 | Junge et al. | 156—24 |

S. LEON BASHORE, Primary Examiner

J. H. HARMAN, Assistant Examiner

U.S. Cl. X.R.

65—31; 252—79.3, 79.4